United States Patent
Li

(10) Patent No.: US 9,755,427 B2
(45) Date of Patent: Sep. 5, 2017

(54) CURRENT CLAMP CIRCUIT BASED ON BCD TECHNOLOGY

(71) Applicant: Si-En Technology (Xiamen) Limited, Xiamen (CN)

(72) Inventor: Yunfeng Li, Xiamen (CN)

(73) Assignee: SI-EN TECHNOLOGY (XIAMEN) LIMITED, Xiamen, Fujian (CN)

( * ) Notice: Subject to any disclaimer, the term of this patent is extended or adjusted under 35 U.S.C. 154(b) by 34 days.

(21) Appl. No.: 14/836,970

(22) Filed: Aug. 27, 2015

(65) Prior Publication Data

US 2016/0241019 A1    Aug. 18, 2016

(30) Foreign Application Priority Data

Feb. 13, 2015 (CN) .......................... 2015 1 0077312

(51) Int. Cl.
| | |
|---|---|
| *H02H 3/00* | (2006.01) |
| *H02H 9/02* | (2006.01) |
| *H02H 9/00* | (2006.01) |
| *H02H 3/08* | (2006.01) |
| *H02H 3/087* | (2006.01) |

(52) U.S. Cl.
CPC ............... *H02H 9/025* (2013.01); *H02H 3/08* (2013.01); *H02H 3/087* (2013.01); *H02H 9/001* (2013.01); *H02H 9/02* (2013.01); *H02H 9/026* (2013.01)

(58) Field of Classification Search
USPC .............................. 361/93.986–87, 93.7–93.9
See application file for complete search history.

(56) References Cited

U.S. PATENT DOCUMENTS 9,054,527 B1 * 6/2015 Fu ............................ H03F 1/523

* cited by examiner

*Primary Examiner* — Danny Nguyen
(74) *Attorney, Agent, or Firm* — Leong C. Lei

(57) ABSTRACT

A current clamp circuit based on BCD technology includes a current-outputting circuit, an output-current-sensing circuit, and a current clamp circuit. The current-outputting circuit outputs a current to the output-current-sensing circuit. The output-current-sensing circuit senses the output current. When the current actually output by the current-outputting circuit is greater than a clamp current, the current clamp circuit outputs a current clamp feedback control signal to the current-outputting circuit, so as to clamp the output current clamp at a set value.

2 Claims, 2 Drawing Sheets

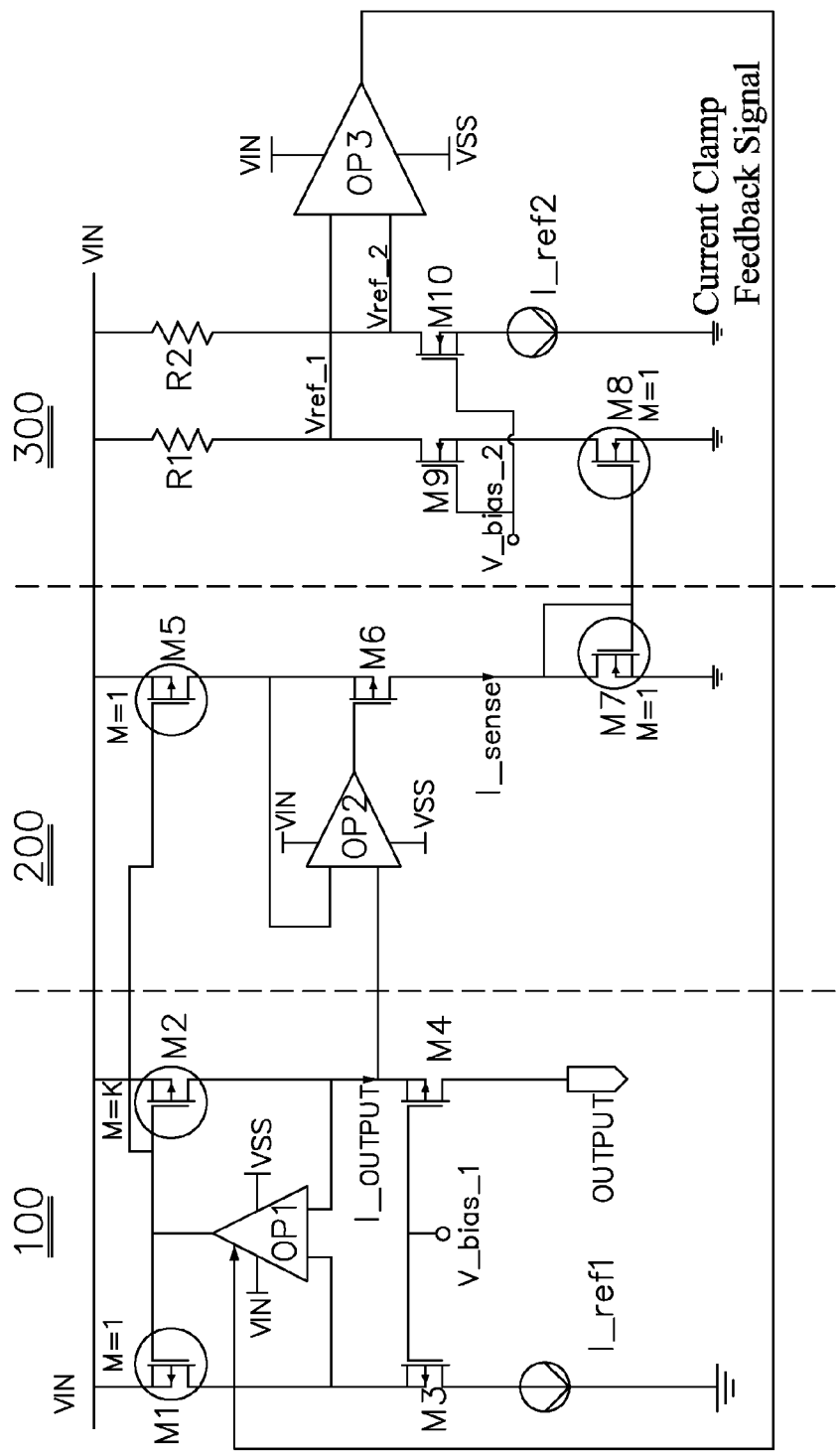
F I G. 1

CURRENT CLAMP CIRCUIT BASED ON BCD TECHNOLOGY

BACKGROUND OF THE INVENTION

1. Technical Field

The present invention relates to current clamp circuits, and more particularly to a current clamp circuit based on BCD technology.

2. Description of Related Art

BCD (Bipolar-CMOS-DMOS) refers to a kind of process engineering related to monolithic integration. First introduced in 1986 by STMicroelectronics (ST), this technology allows bipolar CMOS and DMOS devices to be incorporated in one chip and has been extensively used for the development of high-voltage, high-current products. In high-current applications, if a short circuit happens, an uncontrolled, high current may pass through the chip and the heat generated by the excessive power consumption under the high-voltage, high-current condition tends to damage the circuit. This risk makes a current clamp circuit a necessity for high-voltage, high-current products. A current clamp protects a chip by limiting the output current on the event of a short circuit or abnormal current increase.

In view that there is not a current clamp circuit designed for BCD technology, the inventor has made in-depth research, and herein provides a current clamp circuit based on BCD technology.

SUMMARY OF THE INVENTION

The objective of the present invention is to provide a current clamp circuit based on BCD technology.

For achieving the foregoing objective, the present invention implements the following technical scheme:

A current clamp circuit based on BCD technology comprises a current-outputting circuit, an output-current-sensing circuit and a current clamp circuit. The current-outputting circuit has its input end connected to a high-voltage input voltage VIN. The current-outputting circuit has its output end connected to an input end of the output-current-sensing circuit. The output-current-sensing circuit has an output end connected to an input end of the current clamp circuit. The current clamp circuit has its output end connected to a feedback control end of the current-outputting circuit.

The current-outputting circuit comprises low-voltage PMOS tubes M1, M2, an amplifier OP1, high-voltage LDPMOS tubes M3, M4, and a reference current source I-ref1. The low-voltage PMOS tube M1 has an M value of 1. The low-voltage PMOS tube M2 has an M value of K. The low-voltage PMOS tubes M1, M2 form a first current mirror. The high-voltage LDPMOS tubes M3, M4 have gates thereof commonly connected to a bias voltage V_bias_1. The reference current source I-ref1 is connected in series with and between a drain of the high-voltage LDPMOS tube M3 and the ground. The high-voltage LDPMOS tube M4 has a drain that acts as an output port. The high-voltage LDPMOS tubes M3, M4 having sources thereof connected to two input ends of the amplifier OP1, respectively and connected to drains of the low-voltage PMOS tubes M1, M2, respectively. The amplifier OP1 has an output end connected to gates of the low-voltage PMOS tubes M1, M2. The low-voltage PMOS tubes M1, M2 has sources thereof connected to the high-voltage input voltage VIN.

The output-current-sensing circuit comprises low-voltage PMOS tubes M5, M7, a high-voltage LDPMOS tube M6, and an amplifier OP2. The low-voltage PMOS tubes M5, M7 both have an M value of 1. The low-voltage PMOS tube M5 and the low-voltage PMOS tube M2 form a second current mirror. The low-voltage PMOS tube M5 has a source connected to the high-voltage input voltage VIN. The amplifier OP2 has two input ends connected to drains of the low-voltage PMOS tube M2, M5, respectively. The amplifier OP2 has an output end connected to a gate of the high-voltage LDPMOS tube M6. The high-voltage LDPMOS tube M6 has a source connected to a drain of the low-voltage PMOS tube M5. The high-voltage LDPMOS tube M6 has a drain connected to a drain and a gate low-voltage PMOS tube M7. The low-voltage PMOS tube M7 has a source connected to the ground.

The current clamp circuit comprises a low-voltage PMOS tube M8, high-voltage LDPMOS tubes M9, M10, a reference current source I-ref2, and an amplifier OP3. The low-voltage PMOS tube M8 has an M value of 1. The low-voltage PMOS tube M7 and the low-voltage PMOS tube M8 form a third current mirror. The low-voltage PMOS tube M8 has a drain connected to a source of the high-voltage LDPMOS tube M9. The high-voltage LDPMOS tubes M9, M10 have gates thereof connected to a bias voltage V_bias_2. The reference current source I-ref2 is connected in series with and between a source of the high-voltage LDPMOS tube M10 and the ground. The high-voltage LDPMOS tubes M9, M10 have drains thereof connected to input ends of the amplifier OP3, respectively, and connected to the high-voltage input voltage VIN through resistors R1, R2 that have an identical level of resistance, respectively. The amplifier OP3 has an output end connected to a feedback control end of the amplifier OP1.

The amplifier OP1 has an output stage comprising low-voltage PMOS tubes M11, M12, M13. The low-voltage PMOS tube M11 has a source being connected to the high-voltage input voltage VIN. The low-voltage PMOS tube M11 has a gate driven by a control stage of the amplifier OP1. The low-voltage PMOS tubes M11, M13 have drains thereof connected together to act as the output end of the amplifier OP1. The low-voltage PMOS tube M13 has a gate being the feedback control end of the amplifier OP1. The low-voltage PMOS tube M13 has a source connected together with a drain of the low-voltage PMOS tube M12. The low-voltage PMOS tube M12 has a gate driven by the control stage of amplifier OP1, and a source connected to an input voltage VSS that is low with respect to the high-voltage input voltage VIN.

In designs for high-voltage applications, low-voltage MOS tubes usually perform better than high-voltage MOS tubes in terms of matching. The disclosed current clamp circuit based on BCD technology implements low-voltage MOS tubes as its core current sources, and uses the isolation effect of high-voltage LDPMOS tubes to protect a low-voltage circuit while generating VSS with respect to the high-voltage input voltage VIN (VIN−VSS=5V) to provide the low-voltage core circuit with a current path. In work, the current-outputting circuit outputs a current to the output-current-sensing circuit. The output-current-sensing circuit senses the magnitude of the output current. When the current actually output by the current-outputting circuit is smaller than a clamp current, the amplifier OP3 outputs a current clamp feedback signal as VIN, and the output current is controlled by the feedback loop composed of the amplifier OP1 and the low-voltage PMOS tubes M1 and M2 to come to a preset output current. When the current actually output by the current-outputting circuit is greater than the clamp current, the amplifier OP3 outputs the current clamp feedback control signal to the amplifier OP1, so as to clamp the output current clamp at a set value.

BRIEF DESCRIPTION OF THE DRAWINGS

FIG. 1 is a circuit diagram of a current clamp circuit of the present invention;

DETAILED DESCRIPTION OF THE INVENTION

Figure 2:
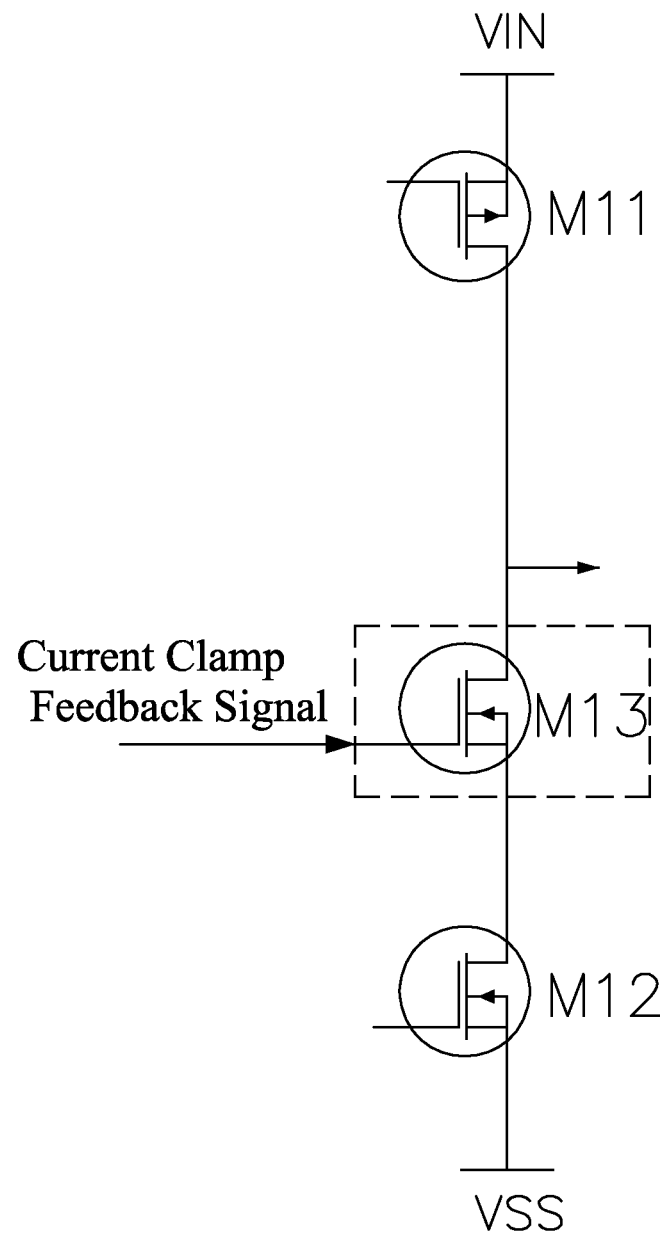
FIG. 2 is a circuit diagram of an output stage in an amplifier OP1 of FIG. 1.

The present invention provides a current clamp circuit based on BCD technology, as shown in FIG. 1, comprises a current-outputting circuit 100, an output-current-sensing circuit 200 and a current clamp circuit 300. The current-outputting circuit 100 has an input end connected to a high-voltage input voltage VIN. The current-outputting circuit 100 has an output end connected to an input end of the output-current-sensing circuit 200. The output-current-sensing circuit 200 has an output end connected to an input end of the current clamp circuit 300. The current clamp circuit 300 has an output end connected to a feedback control end of the current-outputting circuit 10.

The current-outputting circuit 100 comprises low-voltage PMOS tubes M1, M2, an amplifier OP1, high-voltage LDPMOS tubes M3, M4, and a reference current source I-ref1. The low-voltage PMOS tube M1 has an M value of 1. The low-voltage PMOS tube M2 has an M value of K. The low-voltage PMOS tubes M1, M2 form a first current mirror. The high-voltage LDPMOS tubes M3, M4 have gates thereof commonly connected to a bias voltage V_bias_1. The reference current source I-ref1 is connected in series with and between a drain of the high-voltage LDPMOS tube M3 and the ground. The high-voltage LDPMOS tube M4 has a drain that acts as an output port. The high-voltage LDPMOS tubes M3, M4 have sources thereof connected to two input ends of the amplifier OP1, respectively and connected to drains of the low-voltage PMOS tubes M1, M2, respectively. The amplifier OP1 has an output end connected to gates of the low-voltage PMOS tubes M1, M2. The low-voltage PMOS tubes M1, M2 has sources thereof connected to the high-voltage input voltage VIN.

The first current mirror controls the output current in terms of magnitude, and the amplifier OP1 ensures that the drain-source voltages (VDSs) of the two current sources (low-voltage PMOS tubes M1, M2) in the first current mirror are equal so as to prevent channel length effects. In the design of the current mirror, for achieving better matching and reducing voltage mismatch, the low-voltage PMOS tubes M1, M2 are both low-voltage devices, while the amplifier OP1 is also realized by a low-voltage device. The high-voltage device LDPMOS tubes M3 and M4 are used for isolation, and the bias voltage V_bias_1 limits the source voltages of the LDPMOS tube M3 and M4 so as to protect the low-voltage device. An equation is then read as output current I_output=K*I_ref1 (reference current 1), where K is the M value K of the low-voltage PMOS tube M2. Thus, the output port (OUTPUT) and the high-voltage input voltage port (VIN) are competent for high-voltage applications.

The output-current-sensing circuit 200 comprises low-voltage PMOS tubes M5, M7, a high-voltage LDPMOS tube M6, and an amplifier OP2. The low-voltage PMOS tubes M5, M7 both has an M value of 1. The low-voltage PMOS tube M5 and the low-voltage PMOS tube M2 form a second current mirror. The low-voltage PMOS tube M5 has a source connected to the high-voltage input voltage VIN. The amplifier OP2 has two input ends connected to drains of the low-voltage PMOS tube M2, M5, respectively. The amplifier OP2 has an output end connected to a gate of the high-voltage LDPMOS tube M6. The high-voltage LDPMOS tube M6 has a source connected to a drain of the low-voltage PMOS tube M5. The high-voltage LDPMOS tube M6 has a drain connected to a drain and a gate low-voltage PMOS tube M7. The low-voltage PMOS tube M7 has source connected to the ground.

The output-current-sensing circuit 200 senses the magnitude of the output current of the current-outputting circuit. The second current mirror (formed by the low-voltage PMOS tubes M2 and M5) senses the magnitude of the output current. The amplifier OP2 is similarly designed as a low-voltage device. The gate of the high-voltage LDPMOS tube M6 is controlled so as to ensure that the drain-source voltages (VDS) of the low-voltage PMOS tubes M2 and M5 are equal. Meanwhile, the high-voltage LDPMOS tube M6, which is also a high-voltage device, protects the low-voltage device, namely the low-voltage PMOS tube M5. For the low-voltage PMOS tubes M2 and M5, the number proportion sensing current I_sense=I_output/K, where K is the M value K of the low-voltage PMOS tube M2.

The current clamp circuit 300 comprises a low-voltage PMOS tube M8, high-voltage LDPMOS tubes M9, M10, a reference current source I-ref2, and an amplifier OP3. The low-voltage PMOS tube M8 has an M value of 1. The low-voltage PMOS tube M7 and the low-voltage PMOS tube M8 form a third current mirror. The low-voltage PMOS tube M8 has a drain connected to a source of the high-voltage LDPMOS tube M9. The high-voltage LDPMOS tubes M9, M10 have gates thereof connected to a bias voltage V_bias_2. The reference current source I-ref2 is connected in series with and between a source of the high-voltage LDPMOS tube M10 and the ground. The high-voltage LDPMOS tubes M9, M10 has drains thereof connected to input ends of the amplifier OP3, respectively, and connected to the high-voltage input voltage VIN through resistors R1, R2 that have an identical level of resistance, respectively. The amplifier OP3 has an output end connected to a feedback control end of the amplifier OP1.

As shown in FIG. 2, the amplifier OP1 has an output stage comprising low-voltage PMOS tubes M11, M12, M13. The low-voltage PMOS tube M11 has a source being connected to the high-voltage input voltage VIN. The low-voltage PMOS tube M11 has a gate driven by a control stage of the amplifier OP1. The low-voltage PMOS tubes M11, M13 have drains thereof connected together to act as the output end of the amplifier OP1. The low-voltage PMOS tube M13 has a gate being the feedback control end of the amplifier OP1. The low-voltage PMOS tube M13 has a source connected together with a drain of the low-voltage PMOS tube M12. The low-voltage PMOS tube M12 has a gate driven by the control stage of amplifier OP1, and a source connected to an input voltage VSS that is low with respect to the high-voltage input voltage VIN.

The current clamp circuit 300 primarily serves to limit the output voltage of the amplifier OP1. The sensing current I_sense changes its direction by means of the third current mirror (formed by the low-voltage PMOS tubes M7 and M8). The low-voltage PMOS tubes M7 and M8 are low-voltage devices for better matching. When the sensing current I_sense is converted to the reference voltage for the high-voltage input voltage VIN, the high-voltage LDNMOS tubes M9 and M10 serve to isolation, and the bias voltage V_bias_2 limits the source voltage so as to protect the low-voltage devices at the sources of the high-voltage LDNMOS tubes M9 and M10. The sensing currents I_sense and I_ref2 (reference current 2) are converted to voltages Vref_1=VIN−I_sense*R1 and Vref_2=VIN−I_ref2*R2 with respect to VIN through the resistors R1 and R2. The comparison is performed by means of the amplifier OP3. The amplifier OP3 is of a low-voltage design, and resistances R1=R2. When Vref_1 is greater than Vref_2, it is indicated that the actual output current is smaller than the clamp current. The amplifier OP3 outputs its current clamp feedback signal as VIN. In the output stage of the amplifier OP1 (shown in FIG. 2), the low-voltage PMOS tube M13 acts as a lead. The output current is controlled by the feedback loop of the amplifier OP1 and reaches a set output current. When Vref_1 is smaller than Vref_2, the amplifier OP3 outputs the current clamp feedback control signal to control the gate of the low-voltage PMOS tube M13, so as to increase the impedance of the low-voltage PMOS tube M13, thereby limiting the pulling down of the low-voltage PMOS tube M12. This means the feedback loop controlled by the amplifier OP1 becomes invalid, and the feedback loop of the amplifier OP3 takes in charge instead. Thus, for the output current I_output, the clamp current I_clamp=K*I_ref2 (reference current 2), where K is the M value K of the low-voltage PMOS tube M2.

The disclosed BCD-based current clamp circuit works as follow in the event of a short circuit:

1. When there is a short circuit in the circuit for setting the current, the current of the reference current source I_ref1 becomes uncontrolled and can sharply increase. The amplifier OP1 in the current-outputting circuit 100 for maintaining the negative feedback balance, pulls down the gate voltages of the low-voltage PMOS tubes M1 and M2 so as to increase the output current. The output current follows the uncontrolled reference current I_ref1. At the same time, the output-current-sensing circuit 200 senses the sensing current I_sense, increasing with the output current I_output. It is converted to the voltage Vref_1 through the current clamp circuit 300 and compared with the voltage Vref_2 converted from the reference current I_ref2. When the sensing current I_sense increases and becomes greater than the reference current I_ref2, (V_ref1<V_ref2), the voltage input by the amplifier OP3 changes (V_ref1<V_ref2) so that the amplifier OP3 outputs the current clamp feedback control signal of a decreased voltage, thereby increasing impedance of the low-voltage PMOS tube M13 of FIG. 2 and preventing the output voltage of the amplifier OP1 from decreasing, in turn controlling the output current I_output of the low-voltage PMOS tubes M1 and M2 at the set value of K*I_ref2.

2. In the event that a short circuit at the output end (OUTPUT), for the negative feedback controlled by the amplifier OP1 to equalize the input ends of the amplifier OP1, the gates of the low-voltage PMOS tubes M1 and M2 are pulled down fast, making the output current I_output increase sharply. At the same time, the output-current-sensing circuit 200 senses the sensing current I_sense, increasing with the output current I_output. It is converted to the voltage Vref_1 through the current clamp circuit 300 and compared with the voltage Vref_2 converted from the reference current I_ref2. When the sensing current I_sense increases and becomes greater than the reference current I_ref2, (V_ref1<V_ref2), the voltage input by the amplifier OP3 changes (V_ref1<V_ref2) so that the amplifier OP3 outputs the current clamp feedback control signal of a decreased voltage, thereby increasing impedance of the low-voltage PMOS tube M13 of FIG. 2 and preventing the output voltage of the amplifier OP1 from decreasing, in turn controlling the output current I_output of the low-voltage PMOS tubes M1 and M2 at the set value of K*I_ref2.

What is claimed is:

1. A current clamp circuit based on Bipolar-CMOS-DMOS technology, being characterized in comprising a current-outputting circuit, an output-current-sensing circuit, and a current clamp circuit, the current-outputting circuit having an input end connected to a high-voltage input voltage (VIN), the current-outputting circuit having an output end connected to an input end of the output-current-sensing circuit, the output-current-sensing circuit having an output end connected to an input end of the current clamp circuit, and the current clamp circuit having an output end connected to a feedback control end of the current-outputting circuit, wherein the current-outputting circuit comprising low-voltage PMOS tubes (M1, M2), an amplifier (OP1), high-voltage LDPMOS tubes (M3, M4), and a reference current source (I-ref1), the low-voltage PMOS tube (M1) having an M value of 1, the low-voltage PMOS tube (M2) having an M value that is a predetermined value designated at K, the low-voltage PMOS tubes (M1, M2) forming a first current mirror, the high-voltage LDPMOS tubes (M3, M4) having gates thereof commonly connected to a bias voltage (V_bias_1), the reference current source (I-ref1) being connected in series with and between a drain of the high-voltage LDPMOS tube (M3) and the ground, the high-voltage LDPMOS tube (M4) having a drain that acts as an output port; the high-voltage LDPMOS tubes (M3, M4) having sources thereof connected to two input ends of the amplifier (OP1), respectively and connected to drains of the low-voltage PMOS tubes (M1, M2), respectively, the amplifier (OP1) having an output end connected to gates of the low-voltage PMOS tubes (M1, M2), and the low-voltage PMOS tubes (M1, M2) having sources thereof connected to the high-voltage input voltage (VIN);

the output-current-sensing circuit comprising low-voltage PMOS tubes (M5, M7), a high-voltage LDPMOS tube (M6), and an amplifier (OP2), the low-voltage PMOS tubes (M5, M7) both having an M value of 1, the low-voltage PMOS tube (M5) and the low-voltage PMOS tube (M2) forming a second current mirror, the low-voltage PMOS tube (M5) having a source connected to the high-voltage input voltage (VIN), the amplifier (OP2) having two input ends connected to drains of the low-voltage PMOS tube (M2, M5), respectively, the amplifier (OP2) having an output end connected to a gate of the high-voltage LDPMOS tube (M6), the high-voltage LDPMOS tube (M6) having a source connected to a drain of the low-voltage PMOS tube (M5), the high-voltage LDPMOS tube (M6) having a drain connected to a drain and a gate low-voltage PMOS tube (M7), and the low-voltage PMOS tube (M7) having a source connected to the ground;

the current clamp circuit comprising a low-voltage PMOS tube (M8), high-voltage LDPMOS tubes (M9, M10), a reference current source (I-ref2), and an amplifier (OP3), the low-voltage PMOS tube (M8) having an M value of 1, the low-voltage PMOS tube (M7) and the low-voltage PMOS tube (M8) forming a third current mirror, the low-voltage PMOS tube (M8) having a drain connected to a source of the high-voltage LDPMOS tube (M9), the high-voltage LDPMOS tubes (M9, M10) having gates thereof connected to a bias voltage (V_bias_2), the reference current source (I-ref2) being connected in series with and between a source of the high-voltage LDPMOS tube (M10) and the ground, the high-voltage LDPMOS tubes (M9, M10) having drains thereof connected to input ends of the amplifier (OP3), respectively, and connected to the high-voltage input voltage (VIN) through resistors (R1, R2) that have an identical level of resistance, respectively, and the amplifier (OP3) having an output end connected to a feedback control end of the amplifier (OP1).

2. The current clamp circuit based on BCD technology of claim 1, being characterized in: the amplifier (OP1) having an output stage comprising low-voltage PMOS tubes (M11, M12, M13), the low-voltage PMOS tube (M11) having a source being connected to the high-voltage input voltage (VIN), the low-voltage PMOS tube (M11) having a gate driven by a control stage of the amplifier (OP1), the low-voltage PMOS tubes (M11, M13) having drains thereof connected together to act as the output end of the amplifier (OP1), the low-voltage PMOS tube (M13] having a gate being the feedback control end of the amplifier (OP1), the low-voltage PMOS tube (M13) having a source connected together with a drain of the low-voltage PMOS tube (M12), and the low-voltage PMOS tube (M12) having a gate driven by the control stage of amplifier (OP1), and a source connected to an input voltage (VSS) that is low with respect to the high-voltage input voltage (VIN).

\* \* \* \* \*